US007431770B2

(12) United States Patent
Watanabe

(10) Patent No.: US 7,431,770 B2
(45) Date of Patent: Oct. 7, 2008

(54) TABLE DEVICE, FILM-FORMING APPARATUS, OPTICAL ELEMENT, SEMICONDUCTOR ELEMENT, AND ELECTRIC APPARATUS

(75) Inventor: Nobuko Watanabe, Kanazawa (JP)

(73) Assignee: Seiko Epson Corporation (JP)

( * ) Notice: Subject to any disclaimer, the term of this patent is extended or adjusted under 35 U.S.C. 154(b) by 281 days.

(21) Appl. No.: 10/818,456

(22) Filed: Apr. 5, 2004

(65) Prior Publication Data

US 2004/0246309 A1 Dec. 9, 2004

(30) Foreign Application Priority Data

Apr. 7, 2003 (JP) ............................. 2003-102902

(51) Int. Cl.
*B05C 5/00* (2006.01)
*B05C 13/02* (2006.01)
*B05B 13/02* (2006.01)
*B23B 5/22* (2006.01)

(52) U.S. Cl. ....................... 118/305; 118/500; 118/300; 347/55; 279/128

(58) Field of Classification Search ................. 118/500, 118/620, 621, 629, 300, 305, 46; 347/55, 347/111-117, 37, 2; 279/3, 128; 427/466, 427/424

See application file for complete search history.

(56) References Cited

U.S. PATENT DOCUMENTS

| | | | | | |
|---|---|---|---|---|---|
| 5,534,904 | A * | 7/1996 | Sheinman | 347/75 |
| 5,888,127 | A * | 3/1999 | Piper et al. | 451/287 |
| 6,081,414 | A * | 6/2000 | Flanigan et al. | 361/234 |
| 6,102,023 | A * | 8/2000 | Ishiwata et al. | 125/13.01 |
| 6,108,189 | A * | 8/2000 | Weldon et al. | 361/234 |
| 6,248,398 | B1 * | 6/2001 | Talieh et al. | 427/240 |
| 6,377,060 | B1 * | 4/2002 | Burkhart et al. | 324/754 |
| 6,436,843 | B1 * | 8/2002 | Meinhold et al. | 438/758 |
| 6,500,047 | B2 * | 12/2002 | Arai et al. | 451/14 |
| 6,523,921 | B2 * | 2/2003 | Codos | 347/8 |
| 6,606,234 | B1 * | 8/2003 | Divakar | 361/234 |
| 6,660,332 | B2 | 12/2003 | Kawase et al. | |
| 6,672,715 | B2 * | 1/2004 | Isono et al. | 347/71 |
| 6,887,631 | B2 | 5/2005 | Kiguchi et al. | |
| 6,939,407 | B2 | 9/2005 | Kawase et al. | |
| 2004/0183860 | A1 * | 9/2004 | Furukawa | 347/55 |
| 2005/0174043 | A1 | 8/2005 | Kiguchi et al. | |

FOREIGN PATENT DOCUMENTS

| | | |
|---|---|---|
| CN | 1358626 | 7/2002 |
| JP | H04-035827 | 2/1992 |

(Continued)

OTHER PUBLICATIONS

NN83024801, High Throughput Dice and Pick Tool; IBM Technical Disclosure Bulletin, Feb. 1983.*

(Continued)

*Primary Examiner*—Yewebdar T Tadesse
(74) *Attorney, Agent, or Firm*—Harness, Dickey & Pierce, P.L.C.

(57) ABSTRACT

A table device for chucking a substrate includes a chucking unit including a porous body, and having a substrate chucking surface, and a conductive film which is disposed on the substrate chucking surface of the chucking unit, and which is grounded.

7 Claims, 5 Drawing Sheets

FOREIGN PATENT DOCUMENTS

| | | |
|---|---|---|
| JP | 06-011664 | 1/1994 |
| JP | 09-283598 | 10/1997 |
| JP | 10-107131 | 4/1998 |
| JP | 2000-141698 | 5/2000 |
| JP | 2003-037157 | 2/2003 |
| JP | 2003-100445 | 4/2003 |
| WO | WO 02/099477 | 12/2002 |

OTHER PUBLICATIONS

Communication (with translation) from Chinese Patent Application re: related application.

* cited by examiner

TABLE DEVICE, FILM-FORMING APPARATUS, OPTICAL ELEMENT, SEMICONDUCTOR ELEMENT, AND ELECTRIC APPARATUS

BACKGROUND OF THE INVENTION

1. Field of the Invention

The present invention relates to a chucking table for chucking and holding a flexible substrate, which is employed in processes for manufacturing electric apparatuses and the like.

Priority is claimed on Japanese Patent Application No. 2003-102902, filed Apr. 7, 2003, the content of which is incorporated herein by reference.

2. Description of Related Art

Organic EL (electroluminescent) elements, which enable the manufacture of display devices that are thinner than liquid crystal displays, are remarked as a next generation technology. By arranging organic EL elements on a flexible plastic sheet, a thin and flexible display device, similar to a piece of paper, can be manufactured. In the processes for manufacturing organic EL (electroluminescent) elements or a TAB (Tape Automated Bonding), a technical means is employed in which luminescent layers and patterned circuits are formed by discharging droplets, such as of luminescent material or conductive material, toward a substrate or the like which is placed on a table device, using an ink-jet method. In order to hold a substrate or the like on the table device in this process, a porous body is provided into the table device so that a substrate can be held by chucking the same via holes formed in the table device, which is a common practice.

When an ink-jet method is employed in an industrial process, a problem is encountered in that a table device tends to have a significant amount of electrostatic charge because the distance between a nozzle (head) for discharging fluid and a substrate or the like must be set to be less than that in the case of a printer for home use, and because a porous body included in the table device is not made of metal. When the accumulated electrostatic charge is discharged, there is a risk that electronic circuits formed on the substrate may be broken, or flammable solvent included in the liquid may ignite. In order to solve these problems, a method is known in which a so-called ionizer, which is a device for dissipating electrostatic charge, is employed, and also another method is known, in which a table device is formed using a conductive material so that accumulation of electrostatic charge is prevented.

However, such a device for dissipating electrostatic charge may not be sufficiently capable of dissipating the electrostatic charge. In addition, because the latter technique aims to hold relatively hard substrates such as semiconductor wafers or the like, the diameter of the holes formed in the table device is relatively large; therefore, when a so-called flexible substrate, e.g., a thin plastic film or a film-shaped flexible substrate, is chucked, the substrate tends to have chucking marks. When a substrate has chucking marks, it has a deleterious effect in forming and drying of luminescent layers, and problems are encountered in that it is difficult to form a uniform layer, which leads to uneven luminescence and short-circuiting in patterned circuits.

SUMMARY OF THE INVENTION

The present invention was conceived in view of the above circumstances, and objects of the present invention are to prevent accumulation of electrostatic charge on a chucking table which is used in forming films on a substrate using an ink-jet method, and to provide a chucking table which prevents a substrate from having chucking marks.

In a table device, a film-forming apparatus, an optical element, a semiconductor element, and an electronic apparatus, according to the present invention, the following means are employed to achieve the above-described objects.

A first aspect of the invention provides a table device for chucking a substrate including: a chucking unit comprising a porous body, and having a substrate chucking surface; and a conductive film which is disposed on the substrate chucking surface of the chucking unit, and which is grounded.

According to this aspect of the invention, even when the substrate is charged with electrostatic charge, because the conductive film formed on the surface of the table device is grounded, the electrostatic charge is dissipated to the ground; therefore, electric circuits formed on the substrate are prevented from being broken, and a flammable solvent coated on the substrate is prevented from being ignited.

The chucking unit may be a porous ceramic body. In this case, because the porosity of the porous ceramic body is relatively high, and the porous ceramic body includes micropores, the porous ceramic body can uniformly chuck the substrate placed on the table device, and electrostatic charge can be removed from the porous ceramic body, which is a nonconductor, because the porous ceramic body is covered with a conductor.

Even when the substrate is a flexible substrate, which tends to have chucking marks, the flexible substrate is preferably chucked without having chucking marks by using the table device having micropores.

A second aspect of the invention provides a film-forming apparatus for forming a thin film on a substrate having flexibility by ejecting a liquid material onto the substrate, the film-forming apparatus including: a table device according to the first aspect of the invention; an ink-jet head for ejecting the liquid material toward the substrate; an antistatic cover which covers the ink-jet head, and which is grounded; and a moving device for moving the ink-jet head and the table device with respect to each other.

According to this aspect of the invention, because the substrate will not have chucking marks, and accumulation of electrostatic charge is prevented when a thin film of a liquid material is formed on the substrate, a uniform film can be formed on the substrate, and electric circuits will not be broken; therefore, a product having high quality can be manufactured.

The antistatic cover may include an aperture for exposing a face of the ink-jet head facing the substrate. In this case, because the ink-jet head can be disposed close to the substrate, the liquid material ejected from the ink-jet head reaches the substrate more accurately; therefore, a product having high accuracy can be manufactured.

A third aspect of the invention provides an electro-optical apparatus including a luminescent layer fabricated using the film-forming apparatus according to the second aspect of the invention.

According to this aspect of the invention, because a uniform luminescent layer can be formed, an electro-optical apparatus such as a display having fine pixels can be manufactured.

A fourth aspect of the invention provides an electric apparatus including the electro-optical apparatus according to the third aspect of the invention.

According to this aspect of the invention, because a display having fine pixels, as display means, is included, an electric apparatus having the display means exhibiting clear and fine images can be manufactured.

DETAILED DESCRIPTION OF THE INVENTION

Figure 1:
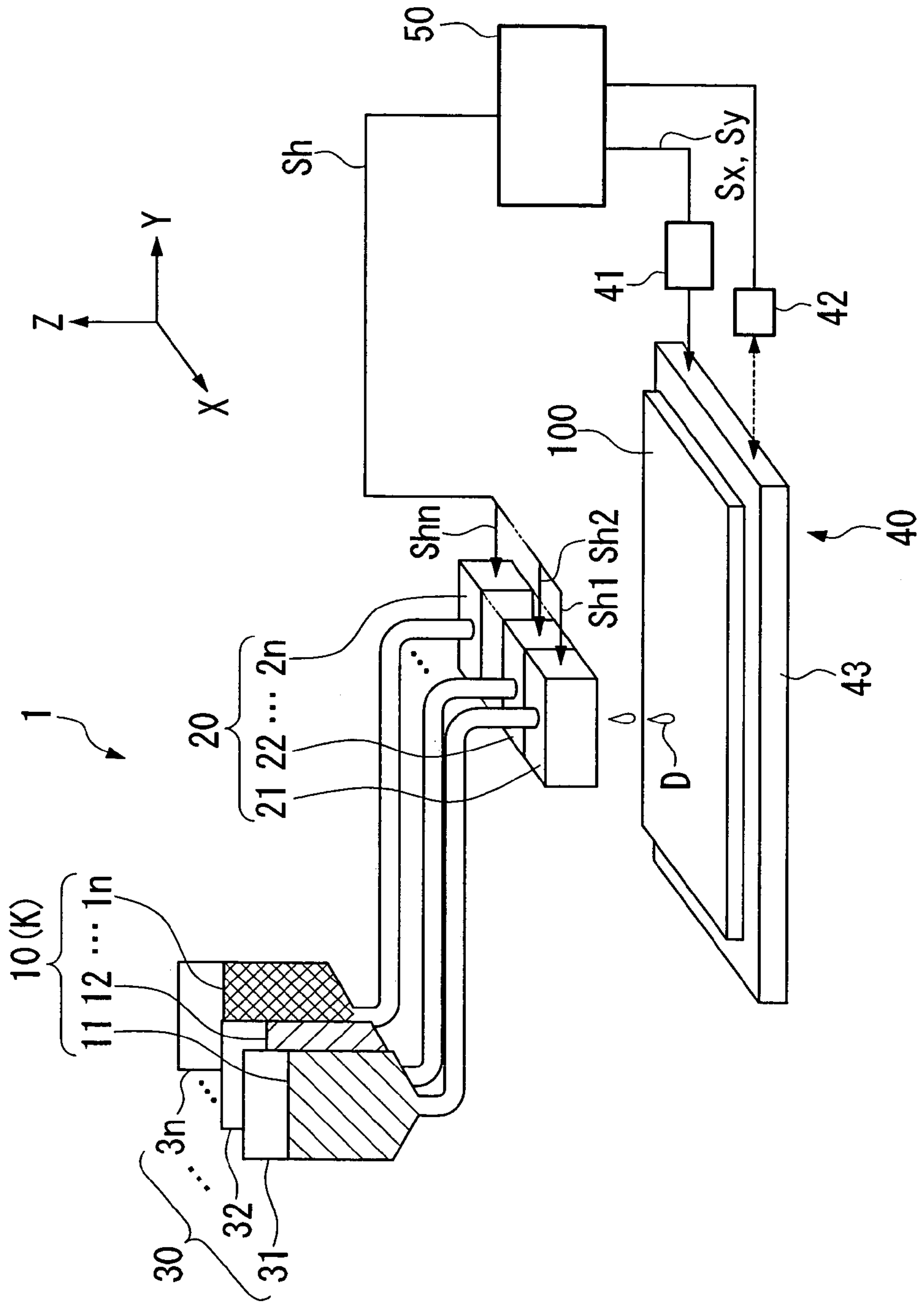
FIG. 1 is a diagram showing a constitution of a film-forming apparatus.

FIG. 1 is a simplified diagram showing a film-forming apparatus 1 according to the present invention. The film-forming apparatus 1 employs an ink-jet method for ejecting droplets to form a film, and includes ink-jet heads 20, tanks 30, a table device 40, and a control device 50.

A substrate 100 used in this invention is a so-called flexible substrate, such as a thin plastic film or a film-shaped substrate having flexibility, and is placed on the table device 40 so as to receive droplets ejected from the ink-jet heads 20 so that luminescent layers, conductive layers, and the like, are formed thereon.

For the material of the substrate 100, a transparent material such as a plastic, such as polyolefin, polyester, polyacrylate, polycarbonate, polyethersulfone, polyether ketone, may be used.

Figure 2:
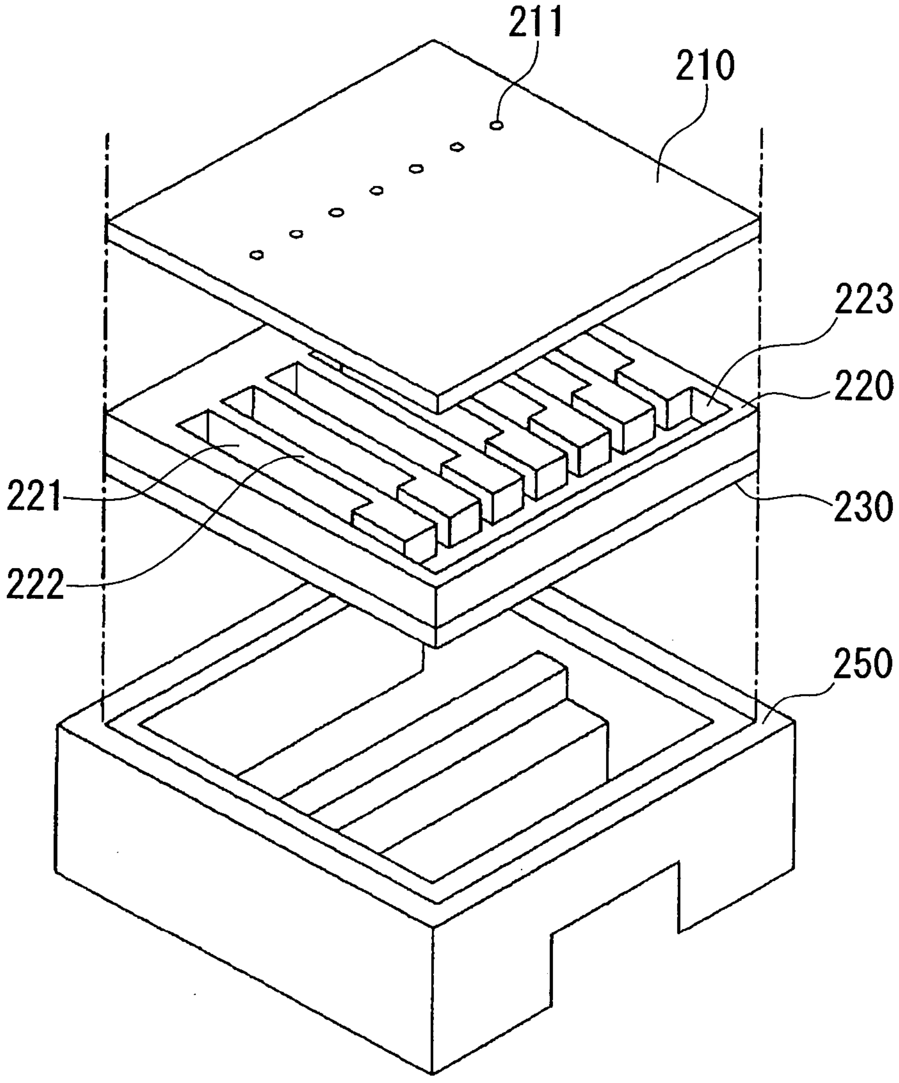
FIG. 2 is a disassembled perspective view showing an ink-jet head.
Figure 3:
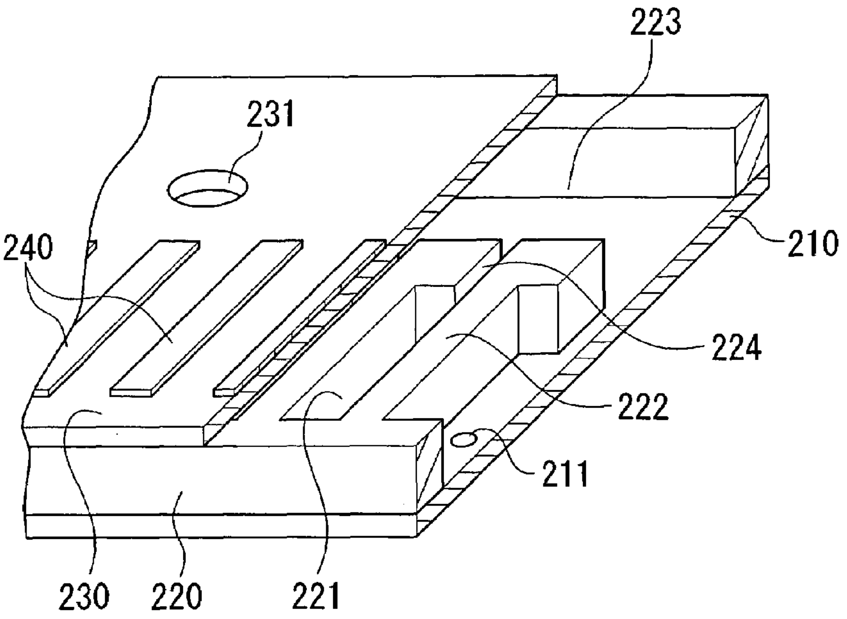
FIG. 3 is a perspective and partial cross-sectional view showing a main portion of the ink-jet head.

The ink-jet heads 20 (21 to 2*n*: "n" is a natural number) have the same structure with respect to each other, and each of which elects droplets D by the ink-jet method. FIG. 2 is a disassembled perspective view showing an example of a structure of the ink-jet heads 20. As shown in FIG. 2, the ink-jet head 20 includes a nozzle plate 210 having nozzles 211, a pressure chamber base plate 220 having a diaphragm 230, and a casing 250 with which the nozzle plate 210 and the pressure chamber base plate 220 are engaged. As shown in FIG. 3, which is a perspective and partial cross-sectional view, the main portion of the ink-jet head 20 is constructed such that the pressure chamber base plate 220 is sandwiched between the nozzle plate 210 and the pressure chamber base plate 220. In the nozzle plate 210, each of the nozzles 211 is formed at a position corresponding to one of cavities 221 which are formed when the nozzle plate 210 is attached to the pressure chamber base plate 220. The pressure chamber base plate 220 is provided with cavities 221, each of which acts as a pressure chamber, by etching a silicon single crystal substrate or the like. One cavity 221 is separated from another by a side wall (a partition wall) 222. Each of the cavities 221 is connected to a reservoir 223, which is a common flow passage, via one of supply ports 224. The diaphragm 230 may include, for example, a thermal oxidation layer. The diaphragm includes ink tank ports 231 through which any one of fluids 10 can be supplied from the tanks 30. At positions on the diaphragm 230 corresponding to the cavities 221, there are formed piezoelectric elements 240. Each of the piezoelectric elements 240 includes an upper electrode, a lower electrode (not shown), and a piezoelectric ceramic crystal, such as a PZT element, sandwiched between the upper and lower electrodes. Each of the piezoelectric elements 240 changes the volume thereof in response to an ejection signal Sh supplied from the control device 50.

Each of the ink-jet heads 20 is not limited to the type for ejecting droplets D by volume change of the piezoelectric element 240, but may be of a type for ejecting droplets D by expansion of the fluid 10 by applying heat using a heating element.

Now, FIG. 1 is referred to again. Each of the tanks 30 (31 to 3*n*) stores one of the fluids 10 (11 to 1*n*), and supplies one of the fluids 10 to one of the ink-jet heads 20 via a pipe. The fluids 10 include a luminescent material (a liquid material) K. The luminescent material K is, for example, an organic material, such as an aluminum quinolinol complex ($Alq_3$) as an example of organic materials of low molecular weight, or a polyparaphenylene vinylene (PPV) as an example of organic materials of high molecular weight. In any case, the viscosity of the fluids 10 may preferably be adjusted using a solvent or the like so that the fluids 10 have sufficient flowability such that the fluids 10 can be ejected as droplets D from the ink-jet heads 20.

The table device 40 includes a table moving unit (a moving device) 41, a position measuring unit 42, and a chucking table (a chucking section) 43, and thus the table device 40 chucks and holds a substrate 100, as well as moves the substrate 100 in the X-direction and Y-direction. The table device 40 is driven by the table moving unit 41 in accordance with a drive signal Sx sent from the control device 50, and moves the substrate 100, which is placed thereon, in the X-direction. Similarly, the table device 40 moves the substrate 100 in the Y-direction in accordance with a drive signal Sy. The position measuring unit 42 sends a signal corresponding to the position (measured in the X and Y direction) of the substrate 100, which is placed on the table device 40, to the control device 50. The control device 50 controls the position of the substrate 100 in response to the position signal sent from the position measuring unit 42.

The control device 50 is, for example, a computer, and includes a CPU, a memory, and an interface circuit (none of which is shown). The control device 50 controls the film-forming apparatus 1 so as to perform ejecting of the fluids 10 including the luminescent material K by executing a predetermined program therein. More specifically, when the fluids 10 are to be ejected, the control device 50 sends the ejection signal Sh to the ink-jet heads 20, and when the table device 40 is to be moved, the control device 50 sends the drive signal Sx or Sy to the table moving unit 41.

Figure 4:
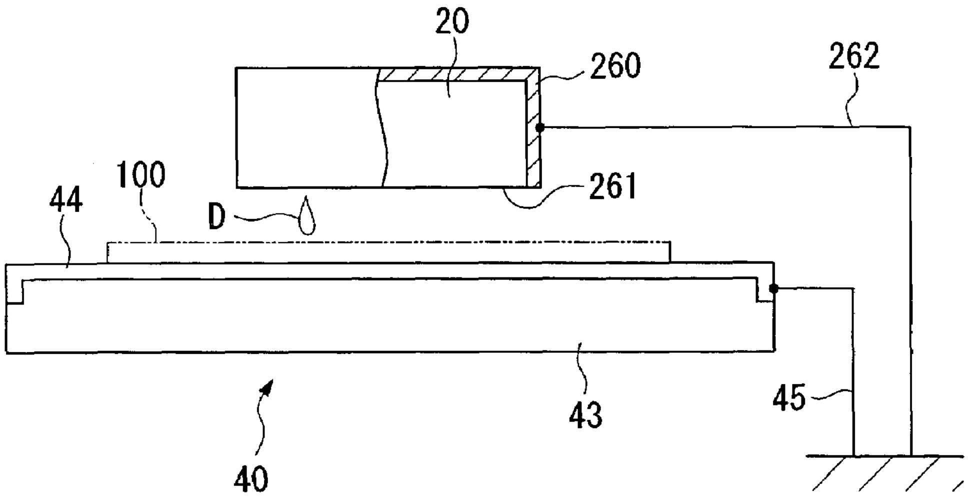
FIG. 4 is a diagram showing a process for dissipating electrostatic charge from the ink-jet head and from a chucking table.

FIG. 4 is a diagram showing a process for dissipating electrostatic charge from the ink-jet heads 20 and from the chucking table 43. The ink-jet heads 20 are covered with an antistatic cover 260. The antistatic cover 260 includes a conductive material, i.e., metal such as iron, copper, or aluminum, or carbide, or the like. The ink-jet heads 20 are positioned so as to have a distance of approximately 100 to 1000 μm from the substrate 100 which is chucked and placed on the chucking table 43. The ink-jet heads 20 and the substrate 100 are disposed so as to be close to each other in order to allow droplets D to reach the substrate 100 more accurately. Accordingly, the underside of the ink-jet heads 20 (which is adjacent to the substrate 100) is not covered with the antistatic cover 260, and is exposed through an aperture 261 so that the ink-jet heads 20 and the substrate 100 can be disposed so as to be close to each other at the above-mentioned distance. A ground line 262 is connected to the antistatic cover 260 for grounding.

The chucking table 43 includes a porous body so as to be able to chuck and hold the substrate 100. The chucking table 43 is connected to a vacuum pump (not shown), and when air is drawn through micropores included in the chucking table 43, the substrate 100, which is placed on the chucking table 43, is chucked and held thereon. An example of the porous body may be a porous ceramic body. In general, the porosity of the porous ceramic body is relatively high, and can be manufactured so as to have continuous micropores whose average diameter is approximately 10 to 50 μm. In a manufacturing method therefor, a high temperature reaction is used; therefore, a portion of a ceramic having high melting point is melted, and a particular three-dimensional network structure is exhibited in which portions of the ceramic are fused to each other. Due to the high temperature reaction, micropores having a smooth wall are connected to each other, which allows to form the chucking table 43 by connecting the same to a vacuum pump. Most of the ceramic, as a constituting material, is an oxide, and most of the oxide is a semiconductor or a nonconductor, and consequently, the porous ceramic body is a nonconductor. Such a porous ceramic body tends to be more widely used for various applications due to its various features such as being light-weight, heat insulation, sound absorption, substance absorption, substance separation, selective transparency, etc., and due to the ceramic's inherent characteristics such as heat resistance, chemical resistance, etc. The use of a porous ceramic body may be further expanded by controlling or adjusting the shape of micropores, the size of micropores, the distribution of the size of micropores, etc., which determine properties of the porous ceramic body. Furthermore, on the surface of the chucking table (on which the substrate is placed), there is formed a conductive layer 44 of metal or the like. The conductive layer 44 is formed using a vacuum deposition method, a sputtering method, a CVD (Chemical Vapor Deposition) method, etc. The vacuum deposition method is a method in which metal is heated under a high degree of vacuum so as to be melted and vaporized, and the vaporized metal is cooled at a surface of an object so as to form a metal coating. Heating of metal may be performed using an electric resistance (Joule's heat), or electron beams. The material to be vaporized and deposited may preferably be metal such as silver, copper, aluminum, or titanium, or conductive high polymer, or the like. The conductive layer 44, which is formed on the surface of the chucking table 43 using the vacuum deposition method, is an extremely thin layer having a thickness of several thousands of angstroms; therefore, the conductive layer 44 will not fill the micropores in the chucking table 43, and thus the chucking properties of the chucking table 43 will not be degraded. A ground line 45 is connected to the conductive layer 44 formed on the chucking table 43 for grounding.

The film-forming apparatus 1 constructed as described above operates as follows.

Figure 5A:
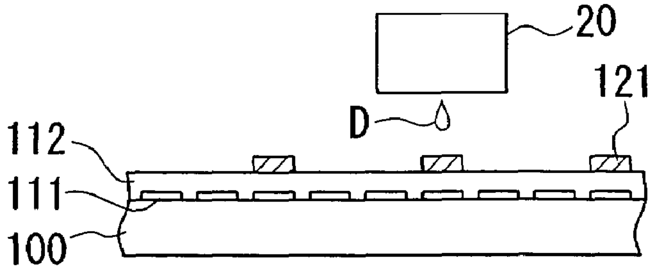
FIGS. 5A to 5C are diagrams showing processes for ejecting and film-forming of a luminescent material.

The substrate 100 is beforehand provided with electrodes 111 (e.g., transparent electrodes of such as ITO) and a hole transportation layer 112 (refer to FIG. 5A). The substrate 100 may also be provided with an electron transportation layer.

First, the substrate 100 is placed on the chucking table 43, and the vacuum pump (not shown) is operated so that the substrate 100 is chucked to the chucking table 43. Then, the control device 50 outputs the drive signals Sx and/or Sy so as to operate the table device 40. The table moving unit 41 moves the substrate 100 with respect to the ink-jet heads 20 depending on the drive signals Sx and/or Sy, and the ink-jet heads 20 is moved to a film-forming area.

Next, any of the fluids 10 are selected depending on the film to be formed, and the ejection signal Sh is sent for ejecting the selected fluids 10. Each of the fluids 10 has been caused to flow to one of the cavities 221 in the ink-jet heads 20. In each of the ink-jet heads 20 to which the ejection signal Sh is sent, the volume of the piezoelectric element 240 changes in accordance with the voltage applied between the upper and lower electrodes. Due to this volume change, the diaphragm 230 deforms, which changes the volume of the cavity 221. As a result, droplets D of fluid 10 are ejected from the nozzle 211 of the cavity 221 toward the upper surface of the substrate 100. The fluid 10 is further supplied from the tank 30 into the cavity 221, from which some amount of the fluid 10 has been ejected.

Figure 5B:
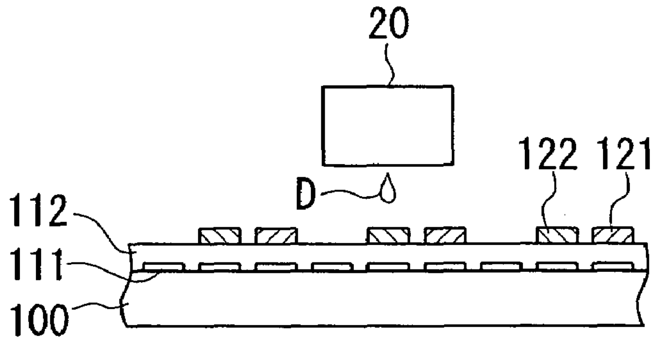
Figure 5C:
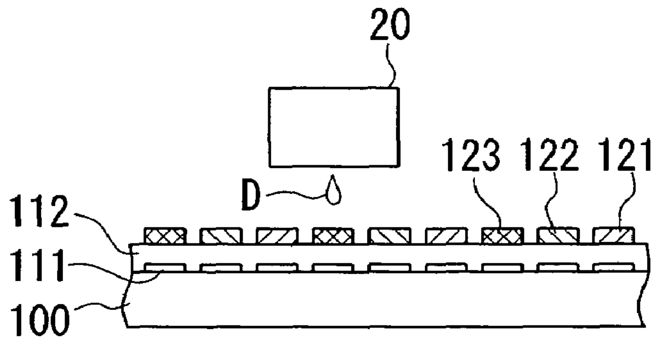

FIGS. 5A to 5C are diagrams showing the processes for ejecting and film-forming of the luminescent material K.

The ink-jet heads 20 rapidly move with respect to the substrate 100 while ejecting the fluids 10 including the luminescent material K toward the upper surface of the substrate 100, and thus droplets D including the luminescent material K reach the surface of the substrate 100. Droplets D (i.e., the fluids 10), which have reached the substrate 100, have a diameter of approximately several tens of micrometers. When a predetermined amount of fluids 10 is ejected, luminescent layers 121 to 123 are formed. For example, a red luminescent material K is ejected from the ink-jet head 21 so as to form the red luminescent layer 121 (refer to FIG. 5A). Similarly, the green luminescent layer 122 (refer to FIG. 5B) is formed by the ink-jet head 22, and the blue luminescent layer 123 (refer to FIG. 5C) is formed by the ink-jet head 23.

Because the porous ceramic body, which is used as the chucking table 43, is formed so as to have micropores whose diameter is less than or equal to the diameter of each of droplets D which has reached the substrate 100, the substrate 100 will not be affected by the porous ceramic body, i.e., the substrate 100 will not have chucking marks. More specifically, because numerous micropores, whose average diameter is extremely small, are uniformly distributed in the chucking table 43, the substrate 100 will not be chucked at points thereon. Accordingly, because the substrate 100 will not have chucking marks, the luminescent layers 121 to 123 can be accurately formed, and thus uneven luminescence can be prevented.

In addition, even when the ink-jet heads 20 and the substrate 100 rapidly move with respect to each other during the operation of the film-forming apparatus 1, accumulation of electrostatic charge can be prevented because the antistatic cover 260 and the chucking table 43 are grounded. Moreover, because the antistatic cover 260 and the chucking table 43 are at the same electric potential, there is no potential difference therebetween. Accordingly, the circuits formed on the substrate 100 will not be broken due to electrostatic charge. Furthermore, flammable solvent will not be ignited by electrostatic charge.

Figure 6:
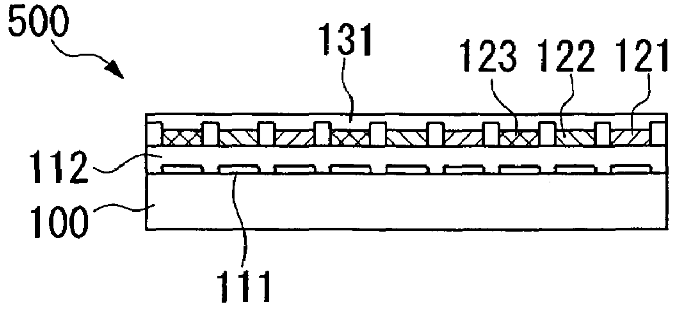
FIG. 6 is a diagram showing an electro-optical apparatus.

FIG. 6 is a diagram showing an electro-optical apparatus 500 which is manufactured through the film-forming processes for forming the film of the luminescent material K as described above. The electro-optical apparatus 500 (e.g., an organic EL device) includes the substrate 100, the electrodes 111, the hole transportation layer 112, and the luminescent layers 121 to 123. On the luminescent layers 121 to 123, there is formed an electrode 131. The electrode 131 is, for example, a cathode electrode. The electro-optical apparatus 500 is used as a display.

Figure 7:
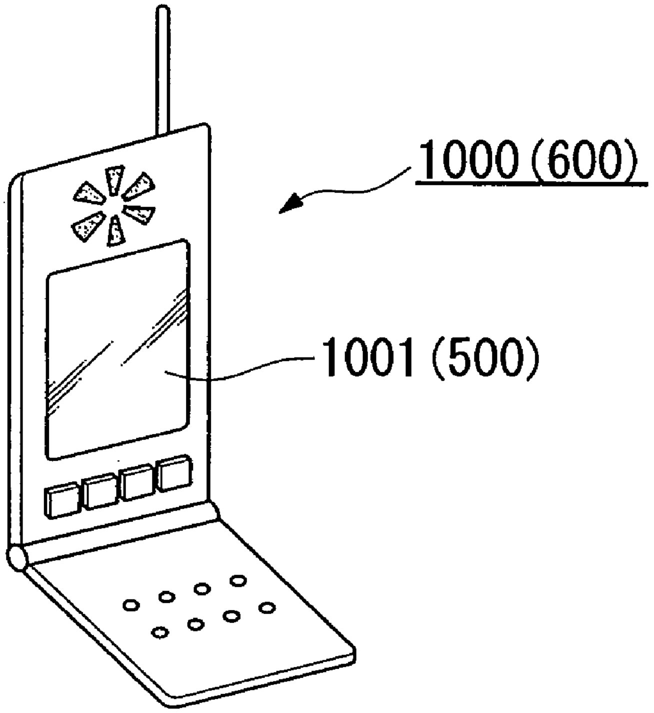
FIG. 7 is a diagram showing an electronic apparatus.

FIG. 7 is a diagram showing an embodiment of an electronic apparatus 600 according to the present invention. A cellular phone 1000 (electronic apparatus 600) includes a display unit 1001 consisting of the electro-optical apparatus 500. As other examples of applications, the electro-optical apparatus 500 as a display unit may be included in a wristwatch type electric apparatus, and the electro-optical apparatus 500 as a display unit may also be included in a portable information processing apparatus such as a word processor, or a personal computer. Because the electronic apparatus 600 includes the electro-optical apparatus 500 as a display unit, the electronic apparatus 600 can produce a high-contrast and high-quality display.

The electrode (anode electrode) may be of ITO (Indium Tin Oxide), and in addition, the electrode may be of a single element such as aluminum (Al), gold (Au), silver (Ag), magnesium (Mg), nickel (Ni), zinc-vanadium (ZnV), indium (In), or tin (Sn), a compound or mixture of these elements, or a conductive adhesive including metal filler. The electrode may preferably be formed using a sputtering method, an ion plating method, or a vacuum deposition method. Pixel electrodes may be formed using a printing process employing, for example, a spin coater, a gravure coater, or a knife coater, and in addition, a screen printing process, a flexography printing process, etc., may be used.

In forming the hole transportation layer, for example, a carbazole polymer and a TPD (triphenyl compound) may be co-deposited so as to form a film having a thickness of 10 to 1000 nm (preferably 100 to 700 nm). Another method may be used, in which a composite ink including a hole injection layer material and a transportation layer material is ejected onto the substrate by the ink-jet method, and then a drying process and a heat treatment are applied. The composite ink may be formed by dissolving a mixture of, for example, polythiophene derivative, such as polyethylene dihydroxy thiophene, and polystyrene sulfonate, in a polar solvent, such as water.

In forming the electron transport layer, a metal-complex compound including metal and organic ligand, preferably, such as $Alq_3$ (tris(8-keno linoleate)aluminium complex), $Znq_2$ (bis(8-keno linoleate)zinc complex), $Bebq_2$ (bis(8-keno linoleate)beryllium complex), Zn—BTZ (2-(o-hydroxyphenyl)benzothiazole zinc), or perylenes, is deposited and laminated so as to form a film having a thickness of 10 to 1000 nm (preferably 100 to 700 nm).

The upper electrode (cathode electrode) has, for example, a laminated structure, and for the lower cathode electrode, metal such as calcium is used, which has a lower work function than that of the upper cathode electrode so that electrons can be efficiently injected into the electron transportation layer or into the luminescent layer. The upper cathode electrode is provided for protecting the lower cathode electrode; therefore, it is preferable that the upper cathode electrode have a greater work function than that of the lower cathode electrode, and the upper cathode electrode may preferably be of, for example, aluminum. The upper and lower cathode electrodes may preferably be formed using a vapor deposition method, a sputtering method, a CVD method, or the like, and among these methods, the vapor deposition method is most preferable in terms of preventing breakage of the luminescent layer due to heat, ultraviolet rays, electron beams, or plasma.

While preferred embodiments of the invention have been described above with reference to the appended drawings, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In the above embodiments, the liquid ejected from the film-forming apparatus is not limited to the luminescent materials, but may be a conductive material, a material having semiconductivity, an electrical insulation material, a dielectric material, a semiconductor material, etc. Moreover, the liquid may be adhesive, affinity materials, non-affinity materials, pigment, etc. Furthermore, the luminescent material may include adhesive, affinity materials, non-affinity materials, pigment, etc.

In the above description, the structure for moving the table device in the X and Y directions was explained; however, the constitution is not limited to this, and the ink-jet heads may be moved, or both the ink-jet heads and the table device may be moved.

In the above description, the processes for forming an optical element (organic EL element) using the film-forming apparatus according to the present invention were explained; however, the present invention is not limited to this, and, for example, displays such as those including liquid crystal, PDP, LCD, etc., and semiconductor elements such as an IC, a LSI, etc., may preferably be manufactured.

The present invention is applicable not only to industrial applications, but also to printers for home use.

What is claimed is:

1. A film-forming apparatus for forming a thin film on a substrate having flexibility by ejecting a liquid material onto the substrate, the film-forming apparatus comprising:
- a table device for chucking a substrate;
- an ink-jet head for ejecting the liquid material toward the substrate; and
- an antistatic cover which covers the ink-jet head, and which is grounded, wherein
- the driver is configured to move the chucking unit with respect to the ink-jet head; and wherein
- the table device comprises:
  - a chucking unit comprising a porous body, and having a substrate chucking surface;
  - a driver that moves the chucking unit in a first direction and in a second direction different from the first direction; and
  - a conductive film which is disposed on the substrate chucking surface of the chucking unit, and which is grounded.

2. The film-forming apparatus according to claim 1, wherein the substrate comprises a flexible substrate.

3. The film-forming apparatus according to claim 1, wherein the chucking unit comprises a porous ceramic body.

4. The film-forming apparatus according to claim 1, wherein the antistatic cover comprises an aperture for exposing a face of the ink-jet head facing the substrate.

5. The film-forming apparatus according to claim 1, further comprising a vacuum pump which draws air through micropores formed in the chucking unit to hold the substrate on the substrate chucking surface.

6. The film-forming apparatus according to claim 1, wherein the conductive film covers substantially the entire substrate chucking surface.

7. The film-forming apparatus according to claim 1, wherein the conductive film is formed using any of a vacuum deposition method, a sputtering method, and a CVD method.

* * * * *